United States Patent [19]
Yamaguchi et al.

[11] 3,856,745
[45] Dec. 24, 1974

[54] PROCESS FOR THE PRODUCTION OF CARBONACEOUS GRAFT POLYMERS

[75] Inventors: Tadashi Yamaguchi; Takayuki Ono, both of Miyagi-ken; Hiroshi Hoshi, Chiba-ken; Michio Hirakawa, Chiba-ken; Isao Watanabe, Chiba-ken, all of Japan

[73] Assignee: Lion Yushi Kabushiki Kaisha(Lion Fat & Oil Co., Ltd.), Sumida-ku Tokyo-to, Japan

[22] Filed: Sept. 17, 1973

[21] Appl. No.: 397,925

[30] Foreign Application Priority Data
Sept. 16, 1972  Japan................................ 47-93042

[52] U.S. Cl. ...... 260/42.14, 106/308 M, 117/100 B, 252/62.1, 252/511, 260/42.25, 260/42.43, 260/42.47, 260/42.49, 260/42.52, 260/42.53
[51] Int. Cl. ............................................. C08f 45/08
[58] Field of Search... 160/308 M; 260/41 R, 42.53, 260/42.14; 117/100 B

[56] References Cited
UNITED STATES PATENTS
2,512,697  6/1950  Te Grotenhuis ............... 260/41.5 R
2,751,369  6/1956  Te Grotenhuis ................. 260/41 R
3,117,943  1/1964  Corbiere et al .................. 260/41 R
3,183,208  5/1965  Jurgeleit .......................... 260/41 T
3,661,620  5/1972  Dekking et al. .................. 260/41 A OTHER PUBLICATIONS
Japanese Patent Publn. No. 22047/1967.
Japanese Patent Publn. No. 3826/1969.

*Primary Examiner*—Allan Lieberman
*Assistant Examiner*—J. H. Derrington
*Attorney, Agent, or Firm*—William J. Daniel

[57] ABSTRACT

A process for the production of carbonaceous graft polymers having a high rate of grafting, characterized in that the polymerization is carried out by bringing a carbonaceous material and a vinylic compound dispersed in an aqueous medium into contact with sulfur dioxide. According to this process, the polymerization reaction can be carried out at a high rate of polymerization without necessity of heating and any expensive organic solvent.

8 Claims, No Drawings

PROCESS FOR THE PRODUCTION OF CARBONACEOUS GRAFT POLYMERS

BACKGROUND OF THE INVENTION

This invention relates to a process for the production of carbonaceous graft polymers (carbon graft polymers) having a high rate of grafting which comprises graft polymerizing a vinylic compound on the surface of a carbonaceous material.

Carbonaceous graft polymers are useful industrial materials as pigments and elements for electric products, for example, electrodes and low temperature heater elements. Besides these uses, these polymers attract public attention as toners for use in electroprinting and as antistatic agents for high molecular materials.

The processes known hitherto for the production of carbonaceous graft polymers include one wherein carbon black having a pH of at least 6 is reacted under heating with a vinyl monomer (Japanese Pat. Publn. No. 22047/1967, one wherein a vinyl monomer having a reactive group is first grafted to powdery carbon and the resulting product is then heated to effect crosslinking (Japanese Pat. Publn. No. 3826/1969) and one wherein styrene is copolymerized with maleic anhydride in the presence of carbon black (J. Ind. Chem. Assoc., Japan, 67, No. 2, 391–396). As these processes take advantage of the mode of thermal polymerization, however, heating is required for these processes at the time of polymerization and control of the reaction conditions of the system is difficult. In addition, these processes have the disadvantage that they guarantee a low rate of grafting. Since these processes limit the sorts of carbon and monomers, it is impossible in these processes to graft any desired monomer to any desired carbon, thus failing to obtain the products meeting the desired demands.

BRIEF SUMMARY OF THE INVENTION

It is therefore an object of this invention to provide an improved process for the production of carbonaceous graft polymers having a high rate of grafting.

It is another object of this invention to provide a method of grafting any desired monomer to any desired carbonaceous material in a simple operation.

It is still another object of this invention to provide a method of grafting a vinylic monomer to a carbonaceous material without necessity of heating and any expensive organic solvent.

These and other objects, features and advantages of this invention will become apparent more fully from the following description.

DETAILED DESCRIPTION OF THE INVENTION

As the result of many researches, it has now been found that the aforementioned objects can be attained easily by adding, at the time of graft polymerization, sulfur dioxide to an aqueous dispersion of a carbonaceous material and a vinylic compound. This invention has been accomplished on the basis of the above finding.

In accordance with this invention, there is provided a process for the production of carbonaceous graft polymers having a high rate of grafting, characterized in that a carbonaceous material and a vinylic compound are brought, while they are dispersed in an aqueous medium into contact with sulfur dioxide to cause dispersion polymerization.

Carbonaceous materials utilizable as starting material for the process of this invention are not specifically limited so far as they consist of carbon. Utilizable for the process of this invention are, for example, carbon black obtained by the furnace method, such as furnace black, lamp black, thermal black, acetylene black and German furnace black; carbon black obtained by the impact method, such as channel black, roller and disc black and German naphthalene black; coke such as petroleum coke, pitch coke and coal coke; and active carbon such as powdery active carbon and granular active carbon. Besides these materials, natural and artificial graphites such as earthy graphite, scaly graphite and colloidal graphite can also be used as the starting carbonaceous material.

Vinylic compounds to be grafted to said carbonaceous material include, in addition to those having vinyl group, divinyl compounds and dienes. Examples of such vinylic compounds include vinyl halides such as vinyl chloride and vinyl fluoride, styrene compounds such as styrene itself and a-methylstyrene, vinyl esters of fatty acids such as vinyl acetate and vinyl propionate, unsaturated carboxylic acids such as acrylic acid and methacrylic acid, esters of unsaturated carboxylic acids such as methyl acrylate, ethyl acrylate, methyl methacrylate, ethyl methacrylate, propyl methacrylate and glycidyl methacrylate, divinyl compounds such as divinylbenzene, and dienes such as butadiene, isoprene, chloroprene and cyclopentadiene. These vinylic compounds may be used singly or in mixture of at least two.

The process of this invention is carried out preferably by dispersing 1 – 100 parts by weight of the carbonaceous material and 0.1 – 100 parts by weight of the vinylic compound into 100 parts by weight of water and adding sulfur dioxide to the resulting aqueous dispersion under agitation. The reaction medium is not limited to water alone. A mixture of water and a lower alcohol such as methanol can be used as well. Sulfur dioxide is preferably added as an aqueous solution thereof but may be blown as gas into the dispersion or added as an acidic salt. It is also possible to use liquidized sulfur dioxide or a combination of substances which are reacted with each other to generate sulfur dioxide, such as a combination of a sulfite and sulfuric acid. Addition of sulfur dioxide is attained in any desired order; sulfur dioxide adsorbed to the carbonaceous material may be added to an aqueous solution of the monomer, or alternatively, the carbonaceous material and the monomer may be added at the same time to sulfurous acid. The amount of sulfur dioxide is selected from a range of 0.001 – 10% by weight, preferably 0.05 – 5% by weight based on the vinylic compound.

The polymerization reaction of this invention does not necessarily require heating but may optionally be carried out by heating up to a temperature of about 50°–60°C to obtain preferable results. The reaction will be completed usually within 0.5 – 5 hours.

After completion of the reaction, a precipitate in the form of a slurry was collected by filtration and dried. A carbonaceous graft polymer thus obtained is subjected to an extraction treatment using an adequate organic solvent such as benzene, whereby a part of ungrafted polymers is removed by extraction but the grafted polymer is not extracted. The grafting efficiency of the carbonaceous graft polymers obtained according to this invention is usually 75% or more.

According to the process of this invention, carbonaceous graft polymers having a high rate of grafting can be obtained from any desired carbonaceous material and any desired vinylic compound. In addition, the polymerization reaction can be carried out smoothly according to this invention at a high rate of polymerization with ease in controlling of the reaction conditions but without necessity of heating and harmful organic solvents. Accordingly, the process of this invention makes itself suited as an industrially operable process.

This invention will now be illustrated in more detail by way of Examples.

EXAMPLE 1

In a 500 ml. three-necked flask dipped into a warm water bath maintained at 52°C. were placed 300 ml. of water and 8.89 g. of carbon for coloring use (manufactured by Asahi Carbon). After addition of 2.98 g. of methyl methacrylate, 2 ml. of an aqueous sulfurous acid solution containing 0.1 g. of sulfur dioxide were added to the mixture under agitation and the reaction was carried out at 52°C. for 1 hour. In this reaction, the pH value of the reaction liquid was about 3. The reaction product in the form of a slurry was then collected by filtration, dried and heated for 5 hours at 100°C. under reduced pressure. 9.19 Grams of a dried carbonaceous graft polymer having a methyl methacrylate content of 3.3 percent were thus obtained. The rate of polymerization of this polymer was 10.1%.

The graft polymer was extracted with benzene for 48 hours but the amount of poly(methyl methacrylate) extracted was found very small. The rate (efficiency) of grafting was 91%.

EXAMPLE 2

To 300 ml of water were added 9.46 g. of carbon for coloring use (manufactured by Asahi Carbon) and 3.55 g. of methyl methacrylate. To this mixture were added 15 ml of an aqueous solution containing 0.1 g of sulfur dioxide and the mixture was then reacted at 53°C. for 4 hours in a manner similar to that described in Example 1. In this reaction, the pH value of the liquid was 2.5 – 3.0. The reaction product thus obtained was analyzed as described in Example 1. The results are shown below.

| | |
|---|---|
| The weight of the dried product (yield) | 12.07 g. |
| The polymer content in the dried product | 21.6 % |
| The rate of polymerization | 73.4 % |
| The efficiency of grafting | 42 % |

EXAMPLE 3

A mixture of 8.96 g. of electroconductive carbon (manufactured by Asahi Carbon), 3.11 g. of methyl methacrylate, 2 ml of an aqueous solution containing 0.1 g. of sulfur dioxide and 300 ml of water was reacted at 52°C. for 1 hour in a manner similar to that described in Example 1. The results are shown below. In this reaction, the pH value of the liquid was about 3.

| | |
|---|---|
| The weight of the dried product (yield) | 9.07 g. |
| The polymer content in the dried product | 1.2 % |
| The rate of polymerization | 3.6 % |
| The efficiency of grafting | 83 % |

EXAMPLE 4

To a mixture of 7.18 g. of electroconductive carbon (manufactured by Asahi Carbon), 3.08 g. of methyl methacrylate and 300 ml. of water were added 15 ml of an aqueous solution containing 0.9 g. of sulfur dioxide. The mixture was then reacted at 55°C. for 4 hours in a manner similar to that described in Example 1. The results are shown as follows. The pH value of the liquid during the reaction was 2.5 – 3.0.

| | |
|---|---|
| The weight of the dried product (yield) | 8.63 g. |
| The polymer content in the dried product | 7.9 % |
| The rate of polymerization | 20.2 % |
| The efficiency of grafting | 45 % |

EXAMPLE 5

To a mixture of 9.01 g. of carbon for coloring use (manufactured by Asahi Carbon), 2.51 g. of vinyl acetate and 300 ml. of water were added 15 ml. of an aqueous solution containing 0.1 g. of sulfur dioxide. The mixture was reacted for 4 hours at 50°C. in a manner similar to that described in Example 1. The results are shown as follows. The pH value of the liquid during the reaction was about 3.

| | |
|---|---|
| The weight of the dried product (yield) | 9.46 g. |
| The polymer content in the dried product | 4.8 % |
| The rate of polymerization | 18 % |
| The efficiency of grafting | 86 % |

EXAMPLE 6

To a mixture of 9.21 g. of electroconductive carbon (manufactured by Asahi Carbon), 1.25 g. of styrene, 1.23 g. of methyl methacrylate and 300 ml. of water were added 30 ml. of an aqueous solution containing 0.2 g. of sulfur dioxide. The mixture was reacted at 50°C. for 4 hours in a manner similar to that described in Example 1. The results are shown as follows. The pH value of the liquid during the reaction was about 3.

| | |
|---|---|
| The weight of the dried product (yield) | 10.62 g. |
| The polymer content in the dried product | 13.3 % |
| The rate of polymerization | 57 % |
| The efficiency of grafting | 43 % |

EXAMPLE 7

To a mixture of 9.35 g. of carbonaceous fibers (10 $\mu\phi \times 100\ \mu$) manufactured from synthetic fibers of acrylic series, 3.20 g. of methyl methacrylate and 300 ml. of water were added 15 ml. of an aqueous solution containing 0.1 g. of sulfur dioxide. The mixture was reacted at 50°C. for 1 hour in a manner similar to that described in Example 1. The results are shown as follows. The pH value of the liquid during the reaction was about 3.

| | |
|---|---|
| The weight of the dried product (yield) | 9.65 g. |
| The polymer content in the dried product | 3.2 % |
| The rate of polymerization | 9.5 % |
| The efficiency of grafting | 93 % |

EXAMPLE 8

To a mixture of 9.04 g. of powdery active carbon manufactured from coconut husk, 3.15 g. of methyl acrylate and 300 ml. of water were added 15 ml. of an aqueous solution of sulfurous acid (0.1 g. as $SO_2$). The mixture was reacted at 52°C. for 1 hour in a manner similar to that described in Example 1. The results obtained are shown as follows. The pH value of the liquid in this reaction was about 3.

| | |
|---|---|
| The weight of the dried product (yield) | 9.58 g. |
| The polymer content in the dried product | 5.6 % |
| The rate of polymerization | 17 % |
| The efficiency of grafting | 89 % |

EXAMPLE 9

To a mixture of 9.26 g. of commercially available pitch coke, 3.01 g. of methyl methacrylate and 300 ml. of water were added 30 ml. of an aqueous solution of sulfurous acid (0.2 g. as $SO_2$). The mixture was reacted at 50°C. for 4 hours in a manner similar to that described in Example 1. The pH value of the liquid during the reaction was about 3. The results thus obtained are shown as follows.

| | |
|---|---|
| The weight of the dried product (yield) | 9.83 g. |
| The polymer content in the dried product | 5.8 % |
| The rate of polymerization | 19 % |
| The efficiency of grafting | 7 % |

EXAMPLE 10

Into a reactor equipped with a stirrer was charged a mixture of 1.0 kg. of petroleum coke (100 mesh powder), 0.6 kg. of methyl methacrylate and 3,000 liters of water. To this mixture were added 1.5 kg. of an aqueous solution of sulfurous acid (0.1 kg. as $SO_2$) while stirring the mixture at 50°C. With continuous stirring, the mixture was reacted at 50°C. for 4 hours and the reactipn product was filtered. The filtration residue was dried at 100°C. under reduced pressure to obtain 1.49 kg. of the dried product. The product was analyzed in a manner similar to that described in Example 1. The results obtained are shown as follows.

| | |
|---|---|
| The content of polymer in the dried product | 33 % |
| The rate of polymerization | 82 % |
| The efficiency of grafting | 31 % |

The dried product was then extrusion molded under the following conditions by means of a screw extrusion molding machine, thereby obtaining a pipe having an outer diameter of 56 mm and an inner diameter of 46 mm. The compression strength of this pipe was 1250 kg./cm².

| | |
|---|---|
| Barrel temperature | 220°C. |
| Die temperature | 220°C. |

EXAMPLE 11

To a mixture of 50.0 g. of powdery graphite (passed through a Tyler standard sieve of 100 mesh; purity: 99.8%), 10.7 g. of methyl methacrylate and 500 ml. of water were added 10 ml. of an aqueous solution of sulfurous acid (0.5 g. as $SO_2$). The mixture was reacted at 50°C. for 2 hours in a manner similar to that described in Example 1. The results obtained are shown as follows.

| | |
|---|---|
| The weight of the dried product (yield) | 60.4 g. |
| The polymer content in the dried product | 17 % |
| The rate of polymerization | 97 % |
| The efficiency of grafting | 17 % |

EXAMPLE 12

Into an autoclave equipped with a stirrer was charged a mixture of 200 ml. of water, 30 g. of carbon for coloring use, 9 g. of butadiene and 2 ml. of an aqueous solution of sulfrous acid containing 0.1 g. of sulfur dioxide. The mixture was maintained at 60°C. and reacted for 7 hours with stirring. In this reaction, a pH value of the liquid was about 3.

The reaction product in the form of slurry was then collected by filtration, washed with water and dried in vacuo. 30.9 Grams of a dried carbonaceous graft polymer containing 2.9% of polybutadiene were thus obtained. A rate of polymerization of this polymer was 10%. No substance was substantially extracted when this graft polymer was treated with benzene for 48 hours.

EXAMPLE 13

Into an autoclave provided with a stirrer was charged a mixture of 200 ml. of water, 30 g. of carbon for coloring use, 9 g. of butadiene and 0.5 g. of sodium bisulfite. The mixture was maintained at room temperature (25°C.) and reacted for 20 hours with stirring. During this reaction, a pH value of the liquid was kept at about 5 – 6.

The reaction product in the form of a slurry was then collected by filtration, washed with water and dried in vacuo. 30.63 Grams of a dried carbonaceous graft polymer containing 2% of polybutadiene were thus obtained. A rate of polymerization of this polymer was 7%. No substance was substantially extracted when this graft polymer was treated with benzene for 48 hours.

EXAMPLE 14

Into an autoclave equipped with a stirrer was charged a mixture of 20 g of carbon (charcoal), 300 ml. of water, 4.5 g. of butadiene, 4.5 g. of styrene, 2 ml. of an aqueous solution of sulfrous acid containing 0.1 g. of sulfur dioxide and 0.5 g. of polyoxyethylene nonylphenyl ether. The mixture was kept at 50°C. and reacted for 5 hours with stirring. During this reaction, a pH value of the liquid was kept at about 3.

The slurried reaction product was then collected by filtration, washed with water and dried in vacuo. 30.45 Grams of a dried carbonaceous graft polymer containing 1.5% of styrene/butadiene copolymer were thus obtained. A rate of polymerization of this polymer was 5%. No substance was substantially extracted when this graft polymer was treated with benzene for 48 hours.

EXAMPLE 15

In an autoclave equipped with a stirrer was charged a mixture of 300 ml. of water, 30 g. of earthy graphite powder (passed through a Tyler standard sieve of 300 mesh; purity 92%), 9 g. of butadiene and 2 ml. of an aqueous solution of sulfurous acid containing 0.1 g. of sulfur dioxide. The mixture was kept at 60°C. and reacted for 3 hours with stirring. During this reaction, a pH value of the liquid was kept at about 3.

The reaction product in the form of a slurry was then collected by filtration, washed with water and dried in vacuo. 38.1 Grams of a dried graphitic graft polymer containing 21.3% of polybutadiene were thus obtained. A rate of polymerization of this polymer was 90%. No substance was substantially extracted when this graft polymer was treated with benzene for 48 hours.

What is claimed is:

1. A process for the production of a carbonaceous graft polymer having a high rate of grafting, comprising separately dispersing a finely divided carbonaceous material and at least one vinyl monomer in an aqueous medium and initiating graft polymerization of said monomer with said material while dispersed in said medium with an initiator consisting essentially of sulfur dioxide and recovering the resultant carbonaceous graft polymer.

2. A process according to claim 1 wherein the carbonaceous material is selected from carbon black, coke, active carbon and graphite.

3. A process according to claim 1 wherein the vinyl monomer is selected from vinyl halides, vinyl esters, unsaturated fatty acids and esters thereof, styrene and substituted styrenes, divinyl compounds and dienes.

4. A process according to claim 1 wherein the aqueous medium is water.

5. A process according to claim 1 wherein the graft polymerization is carried out at a temperature ranging from about room temperature up to about 60°C.

6. A process according to claim 1 wherein sulfur dioxide is added to said medium as a gas, an aqueous solution or an acidic salt.

7. A process according to claim 1 wherein said carbonaceous material is dispersed in an amount of about 1–100 parts and said monomer in an amount of about 0.1–100 parts per 100 parts of said medium, all by weight.

8. A process according to claim 1 wherein the amount of said sulfur dioxide is in the range of about 0.001–10% by weight of such vinyl monomer.

* * * * *